(No Model.)
W. A. STEWART.
PLANTER.
No. 464,399. Patented Dec. 1, 1891.
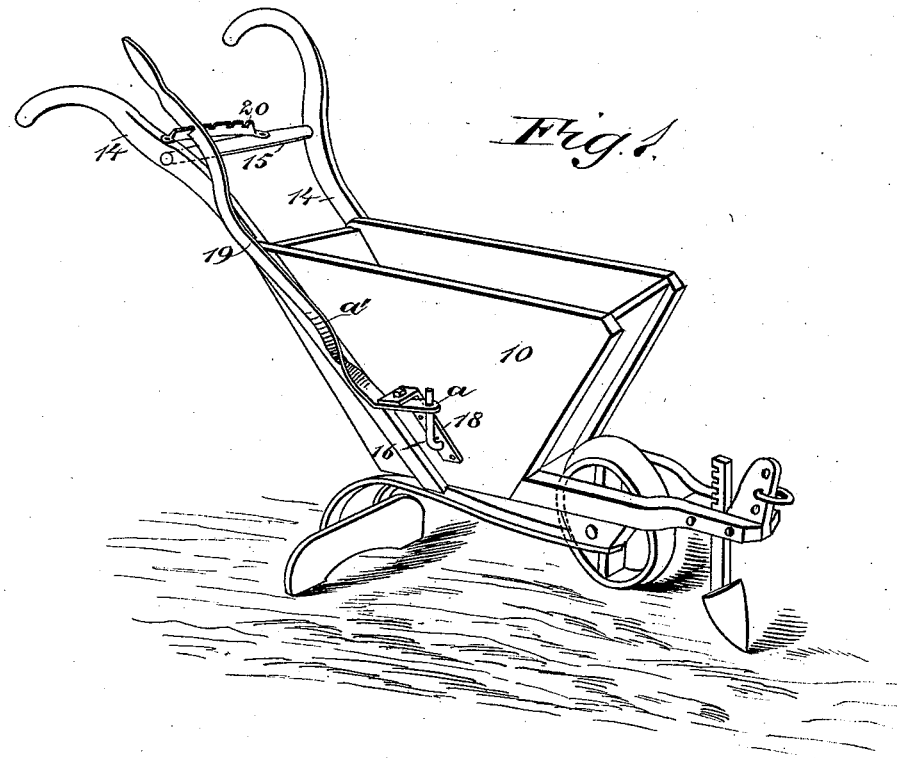
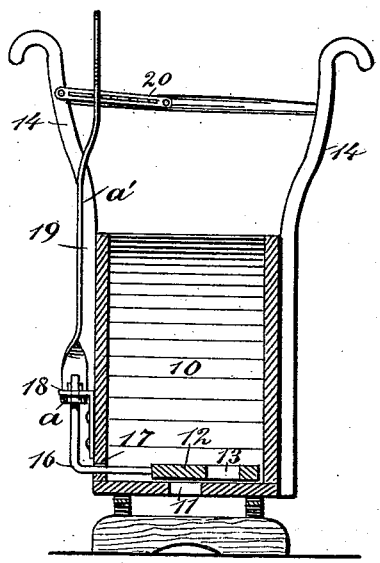
WITNESSES:
INVENTOR
W. A. Stewart
BY Munn & Co
ATTORNEYS

UNITED STATES PATENT OFFICE.

WILLIAM A. STEWART, OF CRYSTAL SPRINGS, MISSISSIPPI, ASSIGNOR TO HIMSELF, AUGUST LOTTERHOS, CHARLES M. HUBER, AND EDWARD C. GODMAN, ALL OF SAME PLACE.

PLANTER.

SPECIFICATION forming part of Letters Patent No. 464,399, dated December 1, 1891.

Application filed May 20, 1891. Serial No. 393,416. (No model.)

*To all whom it may concern:*

Be it known that I, WILLIAM A. STEWART, of Crystal Springs, in the county of Copiah and State of Mississippi, have invented a new and useful Improvement in Planters, of which the following is a full, clear, and exact description.

My invention relates to an improvement in planters, and has for its object to provide an attachment to the drop-slide of planters or fertilizer-distributers, whereby the area of openings through which the seed or the fertilizer drops may be increased or decreased, according to the character of the seed to be dropped or the amount of fertilizer to be placed upon the ground per acre.

A further object of the invention is to provide a means whereby the operator without leaving his position by the planter may accurately increase or decrease the discharge-openings of the planter or cut off entirely the distribution of seed or of fertilizer.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in both the views.

Figure 1 is a perspective view of the planter having the attachment applied thereto, and Fig. 2 is a central vertical section illustrating the connection between the drop-slide of the planter and the attachment.

The body 10 of the planter is represented as provided with its seed or fertilizer distributing opening 11 in the center of its bottom surface and the seed-drop slide 12 as provided with a like opening 13, and said slide as adjustable laterally in the hopper or body of the planter in a manner to cause its opening 13 to register more or less perfectly or to completely register with the opening 11 in the body, and the body or hopper is shown as provided with handles 14, attached to its sides and extending rearward above its upper end surface, the said handles being connected by a cross-bar 15. The seed-drop slide 12 has attached at one end the horizontal member of an angle iron or rod 16, which member extends outward through an opening 17 in the right-hand side of the hopper or body of the planter beyond said side. Upon the right-hand side of the planter a bracket 18 is secured, which preferably extends rearward or follows the inclination of the back of the body of the hopper, as shown in Fig. 1, and the angle-rod 16 is preferably made to pass through the vertical member of the bracket, which is ordinarily an angular one. The bracket may be placed upon the left-hand side of the implement, if so desired. In connection with the bracket an adjusting-lever 19 is employed, which lever comprises a horizontal member *a*, forming the lower end thereof, and a much longer vertical member *a'*. The horizontal member is pivoted in any suitable or approved manner to the bracket 18, and the outer extremity of said member receives or is secured to the upper end of the vertical member of the drop-slide bar 16. The longer or vertical member of the adjusting-lever 19 is carried upward and rearward and is curved at its upper end over the connecting-bar 15 of the handles, upon which bar and preferably upon one member of the handles a rack 20 is secured, consisting of a plate provided with a number of recesses therein, each recess being of a width to receive and neatly fit the upper portion of the adjusting-lever.

In operation, when the lever is in the first notch of the rack, the opening 13 in the drop-slide is carried entirely out of registry with the opening in the body of the planter, as shown in Fig. 2, and the distribution of the contents of the planter is cut off. Each notch that the lever 19 is made to enter increases the discharge from the opening 11 in the planter-body, as the drop-slide is carried in the direction of the right-hand side of the planter a distance each time that the lever is moved to the left to increase the area of the opening 13 in the slide over the opening in the planter. Thus without leaving the handles of the planter the operator may control the amount of seed or of fertilizer to be delivered from the planter and may know positively the amount that is being distributed. In the event that a stump is to be rounded or a certain spot in the ground is to be left unplanted or unfertilized by carrying the adjusting-lever to the right-hand notch of the rack 20, which may be done in a moment, the supply of seed or of fertilizer from the implement to the ground will be at once cut off.

It is evident that when a planter is provided with the attachment above described the amount of seed to be distributed is completely under the control of the operator.

I desire it to be understood that, although the seed-drop slide is illustrated as located within the implement, it may be located upon the outer bottom face thereof instead, and the opening 13 in the slideway may be omitted, in which event the opening 11 in the implement may be carried over one end portion of the drop-slide to the extent required.

Having thus described my invention, I claim as new and desire to secure by Letters Patent—

1. In a planter or fertilizer-distributer, the combination, with a hopper having an opening in its bottom and provided with a bracket at one side, of a drop-slide fitted to slide over the opening in the hopper, a bent operating-lever pivoted to the bracket and having its short arm connected to the drop-slide and its longer arm extending upward and rearward to the handles, and means for locking the said levers in position, substantially as described.

2. In a planter or fertilizer-distributer, the combination, with a hopper having an opening in its bottom, of an apertured drop-slide fitted to slide on the bottom of the hopper, a bracket secured to the hopper, an operating-lever having a horizontal and vertical member, the horizontal member being pivoted to the bracket, an angle-iron having one member secured to the drop-slide and its other member projected through the hopper and connected to the horizontal member of the operating-lever, and a rack upon the handles with which the operating-lever engages, substantially as herein shown and described.

WILLIAM A. STEWART.

Witnesses:
A. T. TOWNES,
J. F. WEATHERLY.